Patented Aug. 4, 1931

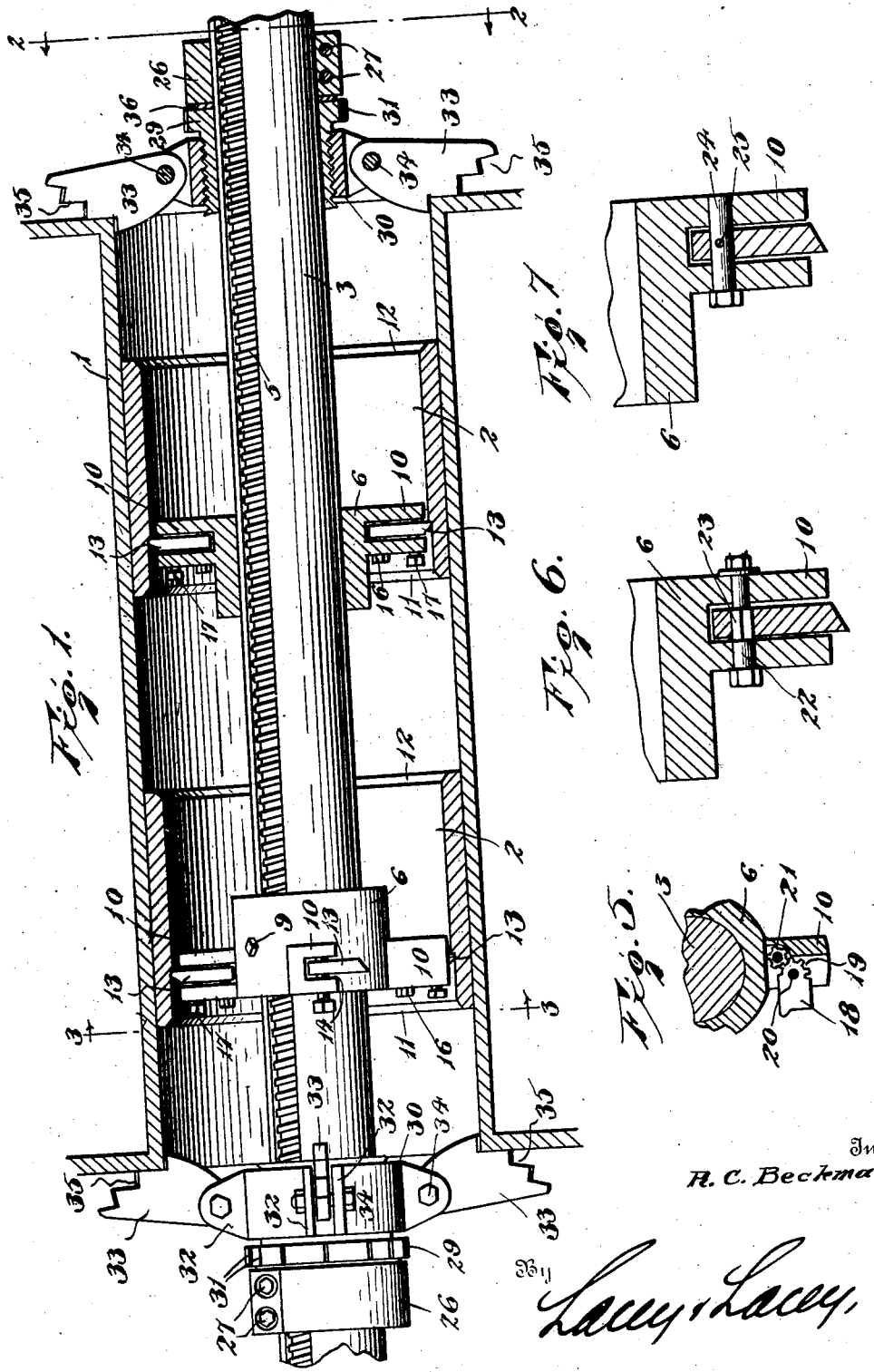

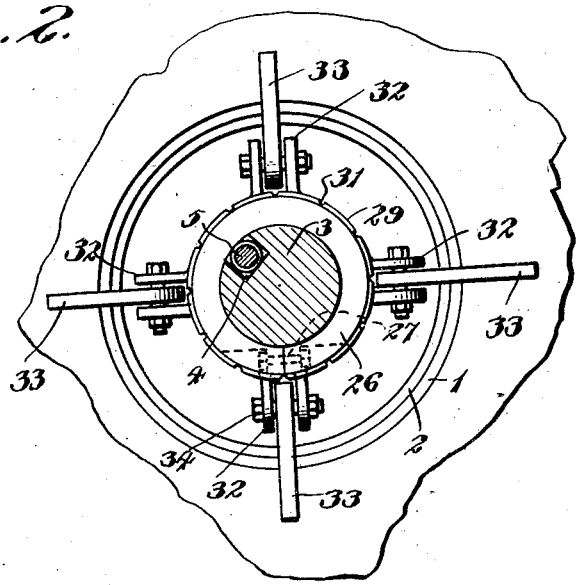
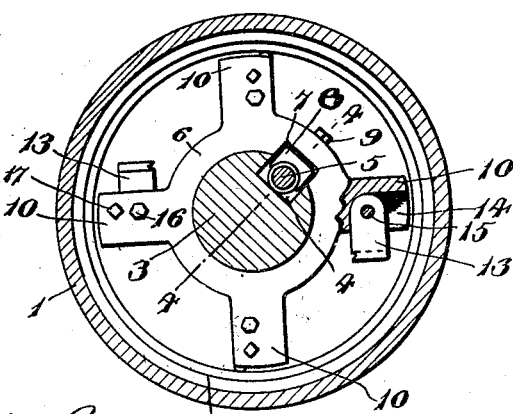
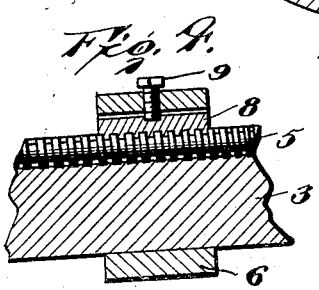

1,817,730

UNITED STATES PATENT OFFICE

ROBERT C. BECKMAN, OF OLEAN, NEW YORK

BORING MACHINE

Application filed August 13, 1929. Serial No. 385,577.

This invention is a boring tool designed more particularly for use in reboring the bushings of piston valves in locomotives without removing the bushings from the valve chamber. The means now provided for this purpose and the method generally practiced consume much time in adjusting the mechanism so as to obtain the proper alinement of the boring devices with the bushings which are to be bored, and the present invention has for its object the provision of a simple mechanism which may be easily brought into proper working position and alined with the bushings and which will permit both bushings to be bored at the same time. This object is attained in such a mechanism as is illustrated in the accompanying drawings, and the invention resides in certain novel features which will be particularly defined in the claim.

In the drawings:

Figure 1 is a view, partly in elevation and partly in longitudinal section, of an apparatus embodying the invention and arranged for use, Fig. 2 is a section on the line 2—2 of Fig. 1, Fig. 3 is a section on the line 3—3 of Fig. 1, Fig. 4 is a detail section on the line 4—4 of Fig. 3, and Figs. 5, 6 and 7 are detail sections through the mounting of the cutters or blades showing different forms of mount.

In the drawings, the numeral 1 identifies a valve chamber in which are a pair of bushings 2 to be rebored. Extending axially through the chamber 1 and the bushings is a boring bar 3 which extends beyond the ends of the chamber and may have its ends supported in any convenient or preferred form of bearings, one end of the bar being operatively connected with gearing for rotating it. Formed longitudinally in the boring bar 3 at the circumference of the same is a groove or recess 4 in which is disposed a feed screw 5 having coarse threads, as shown. The ends of this feed screw are mounted in any convenient manner whereby the screw may rotate independently of the boring bar 3 as it is carried around with the bar but will be held against endwise movement. The gearing referred to may be of any known or approved form and forms no part of the present invention and for that reason has been omitted from the drawings. Encircling the boring bar and the feed screw are cutter heads 6 and each cutter head is formed at one point in its inner circumference with a recess or longitudinal groove, as shown at 7, which mates with the groove 4 in the boring bar and in this groove or recess 7 is mounted a block or nut 8 which is threaded to engage with the feed screw and is held against travel independently of the cutter head so that as the screw rotates the nut or block will be caused to travel longitudinally thereof and so feed the cutter head along the bar to the work. The block may be held in the cutter head by any convenient means, such as a set bolt 9, mounted in the head and engaged with the nut. The cutter head fits closely to the boring bar and, inasmuch as the nut will project into the recess or groove of the bar, the nut serves as a key to lock the cutter head to the bar so that the head must rotate with the bar. Each cutter head is provided with a series of radial arms 10, four of such arms being illustrated in the drawings. Each arm 10 carries a blade or cutter and two diametrically opposite arms carry counter-boring cutters or fillets whereby to form the bevels at the ends of the bushings, indicated at 11 and 12, while the other alternate arms carry knives or cutters adapted to bore the bushings. Each blade or cutter, indicated at 13, is pivotally mounted within a recess 14 formed in the respective arm, the back wall of the recess furnishing an abutment whereby the blade will be prevented from swinging out of operative position when it is in use, while the front of the recess, being open, will permit the blade to be swung into an inoperative position, as shown in Fig. 3. The pivotal support 15 of the blade is formed with a bolt head, indicated at 16, and which may be reached by a long-handled wrench inserted through the end of the chamber 1 to turn the blade to operative or inoperative position. The blade may be further held in its operative position if desired by a set bolt 17 mounted in one side of the carrying arm and adapted to be turned against the side of the blade, as will be understood upon reference to Fig. 1.

Various forms of mounts may be provided for the blades, and in Figs. 5, 6 and 7 I have shown three different arrangements which are efficient, any one of which may be employed as may be preferred. In Fig. 5, the blade 18 is shown as provided at its inner end with cog teeth 19 disposed concentric with its pivot 20 and at one side of the pivot a pinion 21 is mounted in the arm 10 to mesh with said teeth 19, as shown. The axle of the pinion 21 may be extended through the side of the arm and formed with a polygonal head to be engaged by a turning tool. In Fig. 6, the fulcrum shaft 22 is shown as provided between its ends with a flat-sided portion 23 engaging in a correspondingly shaped opening in the blade, and in Fig. 7, the pivotal support 24 is shown as of circular cross section throughout and secured to the blade by a pin 25 inserted through the blade and diametrically through the pivot.

In operation, when the parts have been assembled, the blades for forming the bevels on the bushings are swung outwardly to positions longitudinal of their carrying arms so that their working edges will engage the end edges of the respective bushings. The boring bar being rotated, the cutter heads will be caused to travel along the same, as previously described, and the cutters will form the bevels. After the bevels have been formed, these cutters are shifted to the inoperative position where they extend at right angles to the carrying arms, as shown in Fig. 3, and the other alternate cutters are swung to the operative position. The rotation of the boring bar is then resumed and the cutter heads will be caused to travel through the bushings and the cutters, working against the bores of the bushings, will quickly true the same. When the ends of the bushings have been reached, the blades are again shifted so that the bevel at the far end of each bushing will be produced. It must be understood, however, that the specified sequence of steps need not be adhered to, and the bores may be trued before either bevel is cut, or both bevels may be cut before the bores are trued.

Mounted upon the boring bar at points beyond the ends of the chamber 1 are clamps 26 consisting of split rings or collars each adapted to encircle the boring bar and passed over the feeding screw and provided adjacent its ends with mating lugs having securing bolts 27 inserted therethrough, as shown in Fig. 2, to secure the collar to the bar. Between each clamp and the adjacent end of the chamber 1, a jack screw 29 is fitted about the bar, and the threaded body of the jack screw passes through and engages the threaded bore of a collar or nut 30. The jack screw is provided at its outer end with an annular flange having grooves 31 across its periphery or otherwise formed whereby it may be engaged by a spanner or other tool to be rotated. The collar or nut 30 is provided at equi-distant points about its periphery with pairs of radial lugs 32 between which lugs are pivoted anchor plates 33 by means of bolts 34 inserted through the respective lugs and the inner ends of the plates. The outer free ends of the several anchor plates are provided with a plurality of shoulders 35 which are adapted to engage the corners of the chamber 1, as clearly shown in Fig. 1. When the use of the device is desired, the boring bar is inserted through the valve chamber and both bushings, the anchor plates being at this time collapsed or swung inwardly against the bar. When the cutter heads have been brought into the proper relation to the initial ends of the bushings, the advanced anchor bars will have cleared the far end of the chamber and may be swung out into the position shown in Fig. 1. The jack screw 29 is then rotated so that it will tend to travel outwardly from the collar or nut 30. Inasmuch, however, as the screw abuts the clamp 26, it cannot move longitudinally of the boring bar and the nut 30 will, therefore, be cause to ride on the screw toward the valve chamber and, consequently, will cause the anchor plates to firmly engage and bind against the same so that the bar will be firmly supported. This operation is, of course, repeated at the opposite end of the valve chamber. If desired, a washer 36 of any hard wear-resisting and friction-reducing material may be interposed between the clamp 26 and the head of the jack screw.

From the foregoing description, taken in connection with the accompanying drawings, it will be seen that I have provided a very simple and easily operated device which may be quickly assembled in proper position to bore the bushings and both bushings may be bored at the same time while the labor of alining the boring bar and the cutting tools with the bushings is minimized.

Having thus described the invention, I claim:

In means for the purpose set forth, the combination of a boring bar, a jack screw rotatably mounted thereon, an abutment on the bar for the outer end of the screw, a collar encircling and threaded upon the screw, and anchor plates pivoted upon the collar and arranged to engage the ends of a valve chamber whereby rotation of the screw about the boring bar will effect endwise movement of the collar and cause the anchor plates to bind upon the valve chamber.

In testimony whereof I affix my signature.

ROBERT C. BECKMAN. [L. S.]